No. 750,444. PATENTED JAN. 26, 1904.
P. E. FISHER.
PIPE COUPLING.
APPLICATION FILED NOV. 16, 1903.
NO MODEL.
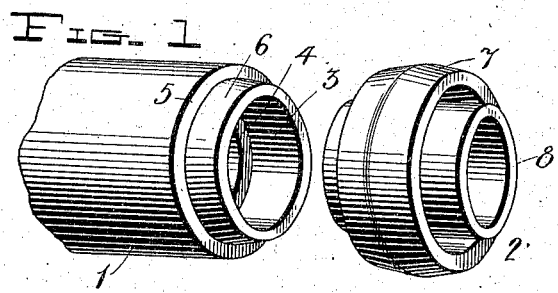
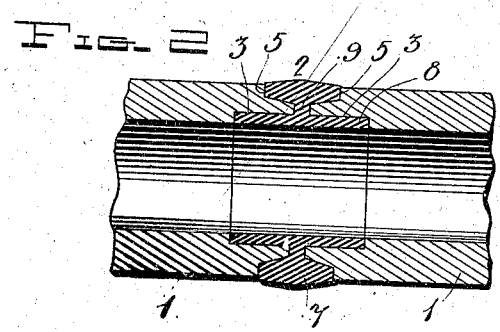
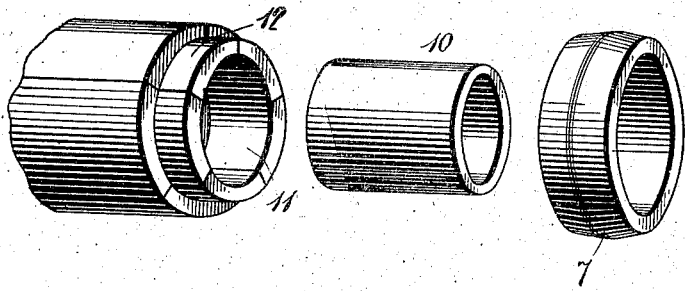
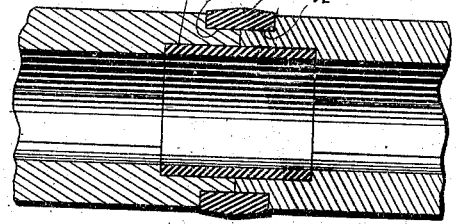
Inventor
P. E. Fisher No. 750,444. Patented January 26, 1904.

UNITED STATES PATENT OFFICE.

PHILLIP E. FISHER, OF SPOKANE, WASHINGTON.

PIPE-COUPLING.

SPECIFICATION forming part of Letters Patent No. 750,444, dated January 26, 1904.

Application filed November 16, 1903. Serial No. 181,297. (No model.)

*To all whom it may concern:*

Be it known that I, PHILLIP E. FISHER, a citizen of the United States, residing at Spokane, in the county of Spokane and State of Washington, have invented certain new and useful Improvements in Pipe-Couplings; and I do hereby declare the following to be a full, clear, and exact description of the invention, such as will enable others skilled in the art to which it appertains to make and use the same.

My invention, which relates to pipe-couplings, contemplates the production of an appliance of this character designed more especially for employment in coupling the meeting ends of water-conducting pipe or conduit lengths built up of wooden or other staves, said improved couplings being preferably of metal and serving to unite the lengths in a manner to render the joints waterproof and to bind the ends of said lengths to prevent separation of the staves under internal pressure.

The details of the improved coupling and the manner of its application are fully and clearly set forth in the following description, in connection with which reference is to be had to the accompanying drawings, in which—

Figure 1 is a perspective view of one form of my improved coupling and of an end of a pipe length fashioned for said coupling. Fig. 2 is a sectional view of the same. Fig. 3 is a perspective view similar to Fig. 1 and showing some modifications. Fig. 4 is a sectional view of the same.

Referring to the drawings by numerals and first to Figs. 1 and 2, 1 designates a portion of a length of pipe, and 2 is one form of my improved coupling. The coupling is designed for employment more especially in joining the meeting ends of wooden pipe lengths, said lengths being built up of staves, as shown, for example, in Figs. 3 and 4, although it will be understood that the coupling is capable of use in joining pipe lengths of other construction and material. Each end of a pipe length is reamed to provide an annular recess 3, terminating in a square shoulder 4, and said end is exteriorly reduced, providing a square shoulder 5 and a preferably tapered annular surface 6. The coupling consists of a collar 7 and sleeve 8, joined by a web 9, formed integrally with both coupling members. The length of the collar is such as to cause its ends to abut against the shoulders 5 5 of the adjacent pipe ends, as shown in Fig. 2, and the length of the sleeve is sufficient to completely fill the recesses 3 3. Likewise also the extreme ends of the pipe lengths extend between the collar and sleeve to the web, and the inner surface of the collar is tapered to closely conform to the tapered surfaces 6 6.

The coupling shown in Figs. 1 and 2 is especially adapted for joining the meeting ends of lengths of high-pressure pipes, in which the tendency to leakage and to separation of the staves at the joints is relatively great. The collar serves effectually to prevent such separation, and the collar and sleeve coöperate to render the joint water-tight by providing numerous obstructions to the passage of water from the interior to the exterior. The stated functions are enhanced by the employment of the tapered surfaces on the pipe ends and collar, the extreme ends of the pipe lengths being tightly wedged between the collar and sleeve, and in addition this construction renders the coupling self-centering.

The coupling shown in Figs. 3 and 4 is well adapted for joining the meeting ends of lengths of low-pressure pipes. In this construction the collar 7 and sleeve 10 are made and applied separately. The ends of a pipe length have inner annular recesses 11 11 receiving the sleeve, and said ends are exteriorly reduced, as at 12 12, to receive the collar. The extreme ends of two adjacent lengths preferably abut against each other, so that no space is provided at the joint for the passage of water from the interior to the exterior.

I claim as my invention—

1. A pipe-coupling comprising, in combination, pipe lengths each having an exteriorly-reduced end providing a shoulder, and having an inner annular recess, and a coupling consisting of an inner sleeve entering the recesses of adjacent pipe ends to be flush with the inner wall of the pipe, and an outer collar encircling the reduced ends of said pipe lengths and engaging said shoulders.

2. A pipe-coupling comprising, in combination, pipe lengths each having an exteriorly-reduced and tapered end providing a shoulder, and having an inner annular recess; and a coupling consisting of an inner sleeve entering the recesses of adjacent pipe ends to be flush with the inner wall of the pipe, an outer sleeve encircling the reduced ends of said pipe lengths to said shoulders and having its inner surface tapered to conform to the taper of said ends, and a web joining said collar and sleeve.

In testimony whereof I affix my signature in presence of two witnesses.

PHILLIP E. FISHER.

Witnesses:
   JOHN F. MARKS,
   ROBT. B. GLASS.